United States Patent
Han

(10) Patent No.: US 7,712,578 B2
(45) Date of Patent: May 11, 2010

(54) MUFFLER OF VEHICLE AND EXHAUST APPARATUS USING THE SAME

(75) Inventor: Hakson Han, Seongnam (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 12/170,086

(22) Filed: Jul. 9, 2008

(65) Prior Publication Data

US 2009/0145689 A1 Jun. 11, 2009

(30) Foreign Application Priority Data

Dec. 7, 2007 (KR) .................... 10-2007-0127010

(51) Int. Cl.
- F01N 1/00 (2006.01)
- F01N 1/08 (2006.01)
- F01N 13/00 (2010.01)
- F01N 13/18 (2010.01)
- F02B 27/02 (2006.01)

(52) U.S. Cl. .............. 181/272; 181/238; 181/265; 181/275; 181/276; 181/282; 60/312; 60/313; 60/322; 60/323; 60/324

(58) Field of Classification Search .............. 181/272, 181/238, 265, 275, 276, 282; 60/312, 313, 60/322, 323, 324
See application file for complete search history.

(56) References Cited

U.S. PATENT DOCUMENTS

| | | | | |
|---|---|---|---|---|
| 4,177,875 A | * | 12/1979 | Kurobe et al. | 181/265 |
| 4,372,421 A | * | 2/1983 | Jackson | 181/243 |
| 4,719,988 A | * | 1/1988 | Kinouchi et al. | 181/273 |
| 5,519,994 A | * | 5/1996 | Hill | 60/313 |
| 5,559,308 A | * | 9/1996 | Hayashi | 181/265 |
| 6,341,664 B1 | * | 1/2002 | Gerber | 181/282 |
| 6,732,509 B2 | * | 5/2004 | Shiga | 60/312 |
| 7,426,980 B2 | * | 9/2008 | Bassani | 181/238 |
| 2005/0023078 A1 | * | 2/2005 | Brower et al. | 181/272 |
| 2006/0090957 A1 | * | 5/2006 | Stuber | 181/270 |

FOREIGN PATENT DOCUMENTS

KR 1997-0011295 A 3/1997

* cited by examiner

*Primary Examiner*—Jeffrey Donels
*Assistant Examiner*—Christina Russell
(74) *Attorney, Agent, or Firm*—Morgan, Lewis & Bockius LLP

(57) ABSTRACT

A muffler includes a case divided into three chambers by two baffles. The first chamber is closest to, and the third chamber is farthest from, the exhaust pipe. An inlet pipe has a first end connected to the exhaust pipe, and a second end in fluid communication with the third chamber. An outlet pipe expels exhaust and water from the first chamber to the exterior. A connecting pipe provides fluid communication between the first and third chambers. The second end of the inlet pipe is above the bottom interior surface of the outlet pipe. The inlet pipe may have holes in the second chamber, above the bottom interior surface of the outlet pipe. The connecting pipe may have holes in the second chamber. The baffles may have holes for the water to flow from the second and third chambers to the first chamber. Also, an exhaust apparatus utilizing the muffler.

5 Claims, 2 Drawing Sheets

US 7,712,578 B2

MUFFLER OF VEHICLE AND EXHAUST APPARATUS USING THE SAME

CROSS-REFERENCE TO RELATED APPLICATION

This application claims priority to, and the benefit of, Korean Patent Application No. 10-2007-0127010, filed in the Korean Intellectual Property Office on Dec. 07, 2007, the entire contents of which are incorporated herein by reference.

BACKGROUND OF THE INVENTION (a) Field of the Invention

The present invention relates to a muffler of a vehicle and an exhaust apparatus using the same.

(b) Description of the Related Art

A typical vehicle exhaust apparatus includes a catalytic converter that filters out hydrocarbons and other impurities from exhaust gas through chemical reactions. Water vapor is generated as a by-product. For example, in the simplest case, a fuel that includes one carbon and n hydrogens:

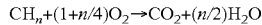

$$CH_n + (1+n/4)O_2 \rightarrow CO_2 + (n/2)H_2O$$

In extremely low temperatures, the water vapor in the muffler may freeze, blocking the outlet of the muffler, and causing poor startability.

To draw off the condensed water in the muffler to the atmosphere, mufflers with narrowing cross-sections, mufflers with inlets partially submerged in condensed water, and curved pipes have been used, but all are generally inadequate.

The above information disclosed in this Background section is only for enhancement of understanding of the background of the invention and therefore it may contain information that does not form the prior art that is already known in this country to a person of ordinary skill in the art.

SUMMARY OF THE INVENTION

A muffler includes a case divided into first, second, and third chambers by first and second baffles. The first chamber is closest to the exhaust pipe, and the third chamber is farthest from the exhaust pipe. An inlet pipe has a first end connected to the exhaust pipe, and a second end in fluid communication with the third chamber. An outlet pipe expels exhaust and water from the first chamber to the exterior. A connecting pipe provides fluid communication between the first and third chambers. The second end of the inlet pipe is disposed above the bottom interior surface of the outlet pipe.

The inlet pipe may have at least one hole in the second chamber, above the bottom interior surface of the outlet pipe. The connecting pipe may have at least one hole in the second chamber. The baffles may have holes for the water to flow from the second and third chambers to the first chamber.

An exhaust apparatus includes a catalytic converter; a resonator connected to the catalytic converter; and the muffler.

DETAILED DESCRIPTION OF PREFERRED EMBODIMENTS

An exemplary embodiment of the present invention will hereinafter be described in detail with reference to the accompanying drawings.

Figure 1:
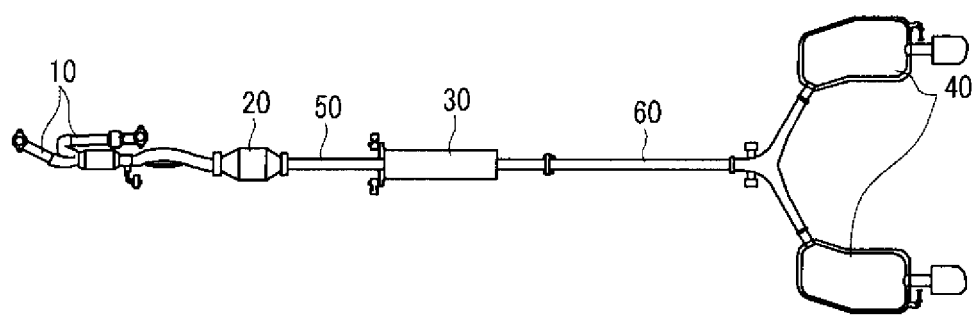
FIG. 1 is a simplified side view of an exhaust apparatus of a vehicle according to an exemplary embodiment of the present invention.

As shown in FIG. 1, an exhaust apparatus of a vehicle according to an exemplary embodiment of the present invention includes a catalytic converter 20, a resonator 30, and a muffler 40.

The catalytic converter 20 receives exhaust gas from an exhaust manifold (not shown) through a front exhaust pipe 10, and filters impurities from the exhaust gas.

The resonator 30 is connected to the catalytic converter 20 through a middle exhaust pipe 50, and reduces noise of the purified exhaust gas received therefrom. The muffler 40 receives the exhaust gas from the resonator 30 through a rear exhaust pipe 60, and further reduces the noise.

The catalytic converter 20 and the resonator 30 may be constructed in any known manner, as will be apparent to those of ordinary skill in the art.

Figure 2:
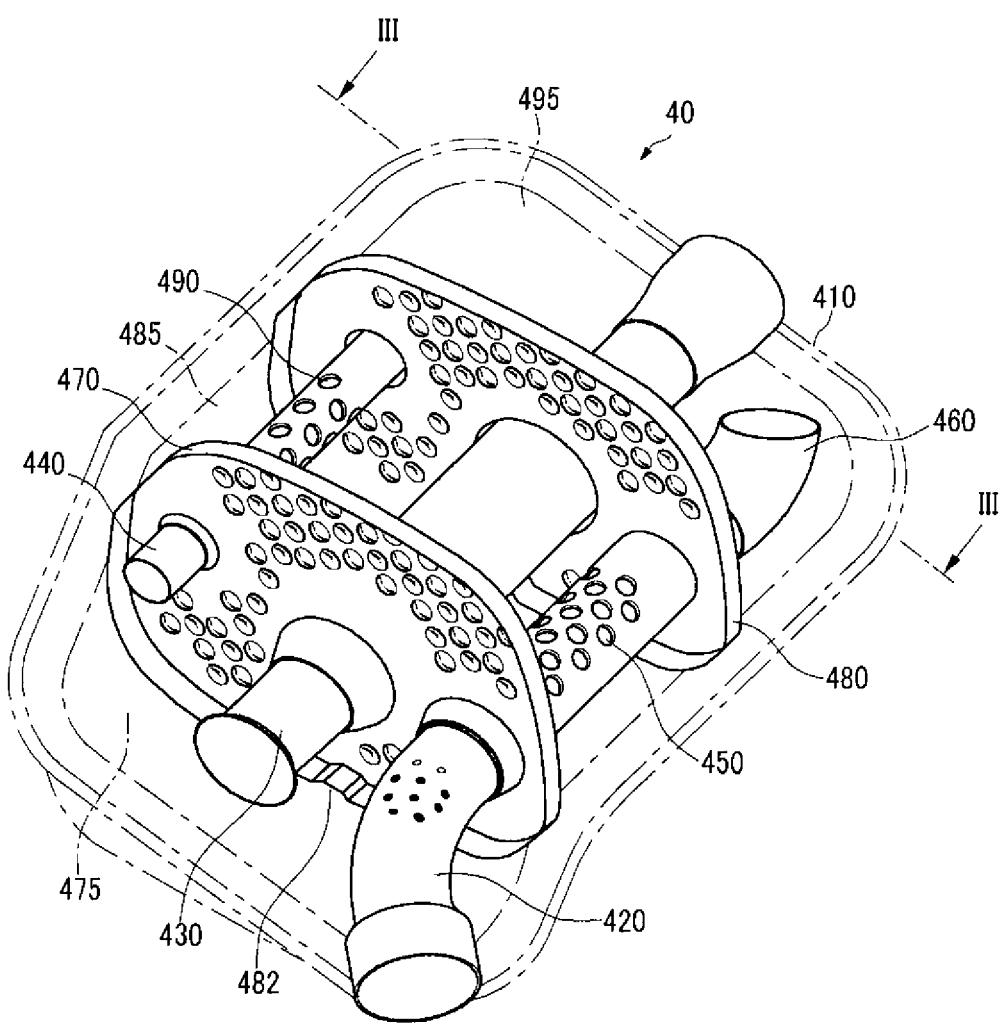
FIG. 2 is a perspective view of the interior of a muffler of a vehicle according to an exemplary embodiment of the present invention.
Figure 3:
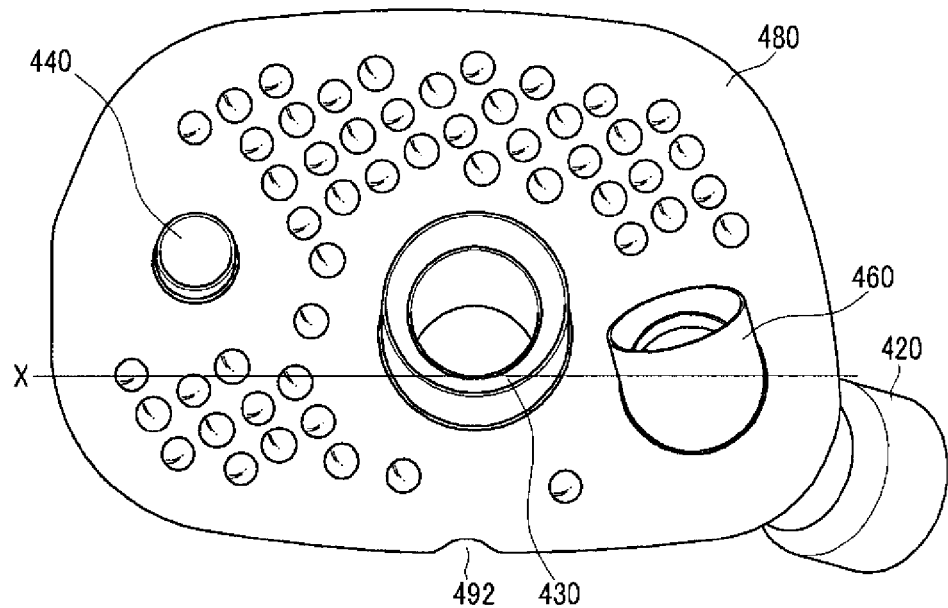
FIG. 3 is a cross-sectional view taken along line III-III in FIG. 2.
Figure 4:
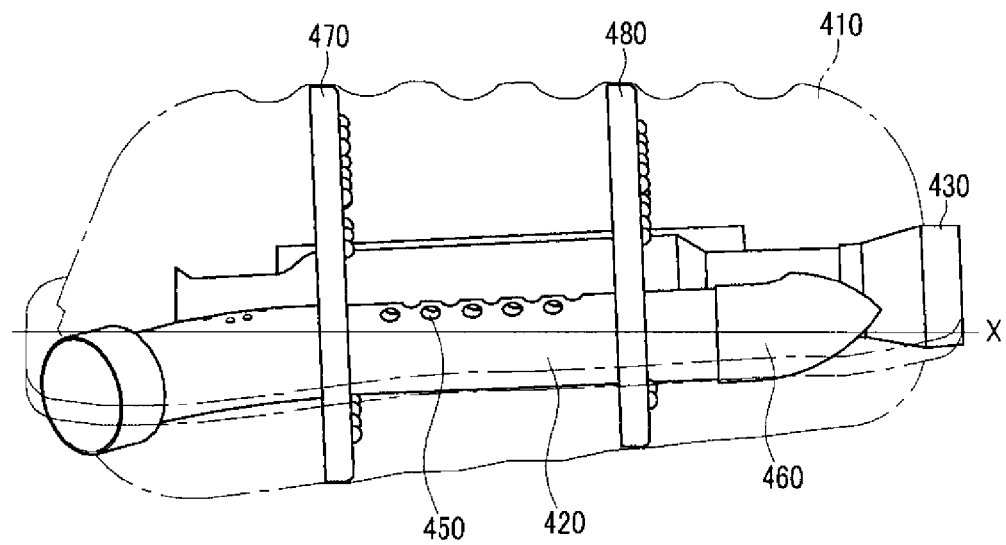
FIG. 4 is a side view of the interior of the muffler of FIG. 2.

Referring to FIGS. 2-4, the muffler 40 according to an exemplary embodiment of the present invention includes a case 410, first and second baffles 470 and 480, an inlet pipe 420, an outlet pipe 430, and a connecting pipe 440.

The case 410 is hollow such that components of the muffler 40 can be mounted therein, and is divided into first, second, and third chambers 475, 485, and 495 by means of the first and second baffles 470 and 480. That is, the first chamber 475 is formed between the case 410 and the first baffle 470, the second chamber 485 is formed between the case 410 and the first and second baffles 470 and 480, and the third chamber 495 is formed between the case 410 and the second baffle 480. The first chamber 475 is closest to the rear exhaust pipe 60.

One end of the inlet pipe 420 is connected to the rear exhaust pipe 60. The inlet pipe 420 penetrates the first and second chambers 475 and 485, and its other end communicates with the third chamber 495. In addition, a hollow, open-ended cap 460 is mounted at the far end of the inlet pipe 420, and first gas holes 450 are provided in the portions of inlet pipe 420 located in the first and second chambers 475 and 485. The exhaust gas supplied from the rear exhaust pipe 60 to the inlet pipe 420 is thus supplied to the third chamber 485, as well as to the first and second chambers 475 and 485 through the first gas holes 450. Noise of the exhaust gas is reduced through expansion and resonance of the exhaust gas.

In addition, referring to FIG. 3, the outlet of the cap 460 and the first gas holes 450 are formed higher than a lowest interior surface X of the outlet pipe, to prevent backflow of condensed water. Therefore, the condensed water in the muffler does not flow out through the cap 460 or the first gas holes 450, but flows out through the outlet pipe 430 to the exterior of the vehicle.

One end of the outlet pipe 430 is open to the exterior of the vehicle (top right in FIG. 2), and the outlet pipe 430 penetrates the second and third chambers 485 and 495, such that its other end communicates with the first chamber 475. Therefore, the exhaust gas and the condensed water in the first chamber 475 are drawn off to the exterior of the vehicle through the outlet pipe 430.

The connecting pipe 440 includes one end communicating with the first chamber 475, and penetrates the second chamber 485 such that its other end communicates with the third chamber 495. Second gas holes 490 are provided at the portion of the connecting pipe 440 located in the second chamber 485. The exhaust gas supplied from the inlet pipe 420 to the third chamber 495 is supplied to the first chamber 475 through the connecting pipe 440. Further, the exhaust gas flows out to the second chamber 485 through the second gas holes 490, and noise of the exhaust gas is reduced through expansion and resonance of the exhaust gas.

The exhaust gas supplied to the first chamber 475, as described above, is drawn off to the exterior of the vehicle through the outlet pipe 430.

The muffler 40 is tilted toward the front of the vehicle (bottom left in FIG. 2) such that the condensed water in the second and third chambers 485 and 495 flows to the first chamber 475 and is drawn off to the exterior of the vehicle through the outlet pipe 430. In addition, first and second condensed water holes 482 and 492 are provided at the bottoms of the first and second baffles 470 and 480, respectively. Therefore, the condensed water in the third chamber 495 flows to the second chamber 485 through the second condensed water hole 492, and the condensed water in the second chamber 485 flows to the first chamber 475 through the first condensed water hole 482.

After that, if the surface of the condensed water in the first chamber 485 is higher than the lowest interior surface of the outlet pipe 430, the inlet cross-section of the outlet pipe 430 is effectively reduced, due to the water blocking a portion of the inlet. Therefore, the flow speed of the exhaust gas increases. Therefore, the condensed water in the first chamber 485 is drawn off to the exterior of the vehicle through the outlet pipe 430.

According to exemplary embodiments of the present invention, since the outlet of the cap, and the first gas holes of the inlet pipe, are higher than the lowest interior surface of the outlet pipe, backflow of condensed water in the muffler may be prevented. Therefore, flow resistance and noise in the muffler may be reduced, engine output may improve, and manufacturing cost may be reduced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A muffler, configured to transport exhaust and water from an exhaust pipe to an exterior, comprising:
   a case;
   first and second baffles dividing the case into first, second, and third chambers, configured such that the first chamber is closest to the exhaust pipe, and the third chamber is farthest from the exhaust pipe;
   an inlet pipe comprising a first end configured to be connected to the exhaust pipe, and a second end in fluid communication with the third chamber;
   an outlet pipe configured to expel the exhaust and water from the first chamber to the exterior; and
   a connecting pipe providing fluid communication between the first and third chambers;
   wherein the second end of the inlet pipe is disposed above a bottom interior surface of the outlet pipe.

2. The muffler of claim 1, wherein the inlet pipe further comprises at least one hole in the second chamber, above the bottom interior surface of the outlet pipe.

3. The muffler of claim 1, wherein the connecting pipe comprises at least one hole in the second chamber.

4. The muffler of claim 1, wherein the baffles comprise holes configured for the water to flow from the second and third chambers to the first chamber.

5. An exhaust apparatus, configured to transport exhaust from an exhaust manifold to an exterior, comprising:
   a catalytic converter for receiving the exhaust from the exhaust manifold and transforming the exhaust into purified exhaust and water;
   a resonator connected to the catalytic converter, configured to reduce noise of the purified exhaust and water; and
   a muffler configured to transport the purified exhaust and water from the resonator to the exterior, wherein the muffler comprises:
   a case;
   first and second baffles dividing the case into first, second, and third chambers, wherein the first chamber is closest to the resonator, and the third chamber is farthest from the resonator;
   an inlet pipe comprising a first end in fluid communication with an outlet of the resonator, and a second end in fluid communication with the third chamber;
   an outlet pipe configured to expel the purified exhaust and water from the first chamber to the exterior; and
   a connecting pipe providing fluid communication between the first and third chambers;
   wherein the second end of the inlet pipe is disposed above a bottom interior surface of the outlet pipe.

* * * * *